United States Patent [19]

Deardurff

[11] 4,416,608
[45] Nov. 22, 1983

[54] APPARATUS FOR FORMING PARISONS

[75] Inventor: Lawrence R. Deardurff, Swanton, Ohio

[73] Assignee: Owens-Illinois, Inc., Toledo, Ohio

[21] Appl. No.: 434,149

[22] Filed: Oct. 13, 1982

[51] Int. Cl.³ .............................................. B27F 1/03
[52] U.S. Cl. .................................. 425/548; 425/549; 425/566; 425/568; 425/569
[58] Field of Search ............... 425/548, 549, 564–566, 425/568, 569

[56] References Cited

U.S. PATENT DOCUMENTS

| | | | |
|---|---|---|---|
| 2,814,831 | 12/1957 | McKee | 425/568 |
| 3,559,245 | 2/1971 | Ryan | 425/549 |
| 4,212,625 | 7/1980 | Shutt | 425/549 |

*Primary Examiner*—Thomas P. Pavelko
*Attorney, Agent, or Firm*—Thomas L. Farquer; M. E. Click

[57] ABSTRACT

An injection nozzle for use in an injection molding apparatus including a generally annular base portion which supports a generally cylindrical hollow side wall portion. The hollow side wall portion terminates at its upper end portion in an inwardly beveled heat transfer control portion. The beveled heat transfer control portion terminates in an angled mating portion which is of complementary angle to the angled mating surface of an injection nozzle accepting recess in the injection mold portion of the apparatus. The injection nozzle structure provides for controlled heat transfer control from the sprue portion of an injection molded parison to prevent crystallization in the sprue portion of the parison.

21 Claims, 7 Drawing Figures

APPARATUS FOR FORMING PARISONS

BACKGROUND OF THE INVENTION

This invention relates generally to the field of injection molding of plastic articles, such as blowable plastic parisons. The parisons are typically formed by injecting molten plastic around a set of central core pins, and subsequently cooling the array of parisons while on the core pins. The cooled parisons next are stripped of the gate or tail portion of the parison and collected for subsequent blow molding into containers.

The art of container forming by blow molding a previously injection molded parison has advanced to the state where several thousand such containers can be formed per hour from a presupplied stock of parisons. In such a rapid production rate system, it is necessary to require that the parisons, from which the containers are ultimately blown, are themselves formed rapidly, inexpensively and with a high quality in each parison so that the total reject rate from the parison formation step is minimized. Accordingly in the injection molding process, which forms the parison for subsequently blow molding, it has become critical to reduce the overall cycle time of the injection molding cycle while increasing parison quality and reducing injection molding machine down time.

Currently available injection molding machines have not provided the overall desirable features disclosed above. For example, most currently available injection mold molding machines include a bipartate injection mold which terminates in flat space which houses an inlet port. An injection nozzle, which is connected to an injector assembly, which supplies molten thermoplastic material, fits into the inlet port with a very snug fit in the port. Also, current injection molding machines provide for a long tail or sprue section on the parison which must be removed prior to blow molding of the parison into a finished container. This provides for more waste plastic, which must be recylced, at a significant cost or discarded. Further, such an approach provides for high crystallinity in the parison sprue which is disadvantageous to the performance of the final blown container.

A number of problems are inherent in the above approach to injection molding of parisons. The large sprue or tail area on the bottom of the parison allows highly crystallizable materials, for example, polyethylene terephthalate, to crystallize as the parison is being cooled in the injection mold station. When the sprue is a crystallized plastic, it does not stretch well when the parison is being biaxially oriented to produce strong pressure resistant plastic containers such as those suitable for soft drink and beer packaging. Accordingly, the sprue must be removed in a subsequent station by a sprue removal device to provide a blowable parison for container fabrication. Such a step in parison fabrication requires additional cycle time thereby lowering the overall production of the injection molding machine. Further, in many cases, residual crystallinity remains in the sprue area of the bottom of the parison which is translated into a poorly oriented centrally located heel area on the bottom of the finished container. Such a poorly oriented heel area in the container is substantially less pressure resistant and provides an inferior container for holding pressurized fluids.

Further, when attempts were made to militate against the formation of highly crystalline sprue portions on parisons by moving the injection nozzle to intimate contact with the bottom of the parison, within the injection mold halves, further problems occurred. Namely, when the parison molds were opened, drooling or stringing of the injected plastic occurred which was detrimental to high quality parison production. A related, and very serious, problem occurred when the injection nozzle was placed such that the mold halves closed around the injection nozzle. Upon repeated clamping of the injection mold halves onto the hollow injection nozzle, as injection cycles occurred, the nozzles stress-cracked and were no longer useful. Further, at the end of the machine cycle and at the beginning of the cycle, as the molds heated and cooled they expanded and contracted. The nozzle also expanded and contracted, but usually at a different rate, since it was of a different metal alloy and in intimate thermal contact with the hot plasticizer. This situation led to crushing of the nozzle within the mold halves as differential thermal expansion and contraction occurred. This also caused premature replacement of the nozzles due to metal fatigue and subsequent failure.

SUMMARY OF THE INVENTION

The present invention overcomes the shortcomings of previous injection molding systems, and resultant parison problems, through an injection molding system which includes an injector assembly for supplying molten plastic through manifold assembly into a plurality of horizontally spaced apart injection nozzles. The injection nozzles are insertable into bipartate injection mold housing. The injection mold housing accepts the nozzle through a mold recess which includes a generally cylindrical indwelling portion or recess wall which terminates at an angled mating surface, which angles inwardly of the injection mold and terminates in a centrally located flat central mating surface. A passageway or gate is located at the center of the flat central mating surface to provide plastic passage through the gate into the centrally located hollow parison formation cavity. The injection nozzle includes a generally annular base portion which supports a generally cylindrical hollow sidewall portion. The sidewall portion terminates at its upper end in an inwardly beveled heat transfer control portion. The beveled heat transfer control portion is connected to an angled mating portion which is of complementary angle to the angled mating surface of the mold recess. The angled mating portion terminates at a flat central mating surface which is of complementary geometry and dimensions to the flat mating surface of the injection mold. The flat central mating surface includes a centrally located outlet port which merges with the gate of the mold to thereby provide a continuous passage for molten plastic from the injector assembly, through the manifold, through the injection nozzle and into the parison formation cavity.

In one embodiment of the invention, the total length of the sprue or tail on the heel portion of the parison bottom is sixty-thousandths of an inch or less, thereby militating against the need to remove the sprue before blow molding the parison into a container. Such a limited sprue dimension is achieved by limiting the added lengths of the gate and outlet port to the desired dimension. It has been discovered according to the present invention that such a short sprue cools quickly enough to remain a amorphous plastic. Such an amorphous plastic is easily blow molded into a molecularly oriented bottom portion of the container without any significant residual crystallinity. Prior large sprue portions could not be cooled quickly enough to avoid crystallization, which resulted in the problems described above.

In another embodiment of the apparatus for forming parisons according to the present invention, the angled mating portion of the injection nozzle is formed of a roughened surface finish, such as a vapor honed finish, to minimize heat transfer from the end of the injection nozzle adjacent the injection mold gate into the mold. The vapor honing may be achieved by any conventional technique. This embodiment of the invention allows further heat withdrawal from the injection mold gate area and the nozzle outlet port area to rapidly cool an amorphous parison sprue. Alternatively, the surface may be roughened by conventional acid etching techniques. Either technique provides a roughened surface to minimize heat transfer from the nozzle to the mold.

In another embodiment of the invention, a heater band with an insulated covering shroud therearound is provided on the exterior of the generally cylindrical hollow sidewall portion of the nozzle to assist in maintaining the plastic passageway of the injection nozzle molten during parison formation.

A number of advantages are presented by the present invention including improved cycle time, on the order of 20% compared to conventionally available parison injection molding machines. Also, an increased percentage of acceptable parisons due to amorphous sprue formation are had. Further, the lightweighting of parisons is allowed since the amorphous sprue portion may be blown into a highly molecular oriented bottom portion for the container, militating against a thick, less oriented container bottom to achieve the same gas permeation characteristics. Further, the present invention provides increased nozzle and injection molding machine lifetime since the matched angle of the mating portions of the injection mold and the injection nozzle prevent crushing of the injection nozzle during heat-up and cool-down of the machine.

BRIEF DESCRIPTION OF THE DRAWINGS

The above features and advantages of the present invention will become readily manifest to one skilled in the parison and container-forming art from reading the following detailed description of the preferred embodiments of the invention, when considered in view of the accompanying drawings, in which.

DESCRIPTION OF THE PREFERRED EMBODIMENTS

Figure 1:
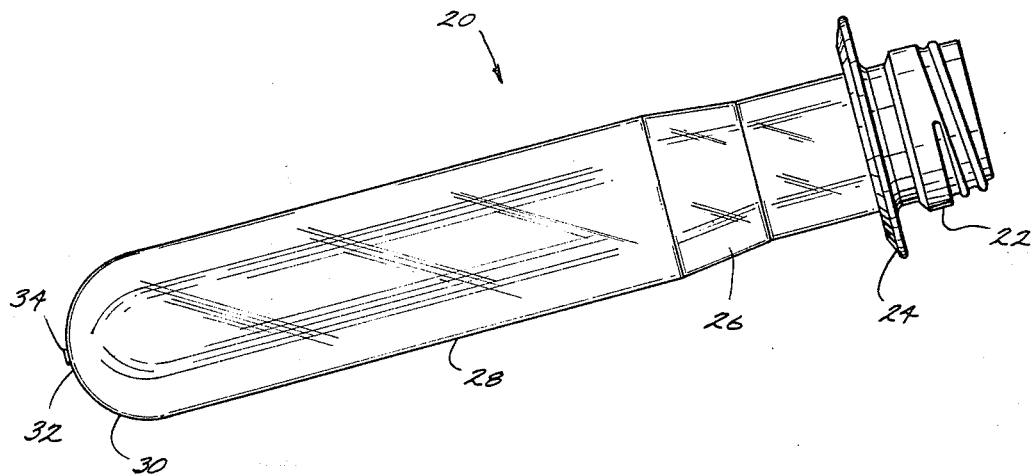
FIG. 1 is a perspective view of a hollow, organic, thermoplastic parison prepared according to the present invention.

Referring to the drawings, particularly at FIG. 1, there is illustrated an organic, thermoplastic parison 20 which is formed by the parison forming apparatus according to the present invention. The parison 20 includes a threaded neck finish 22 which in integral with an outstanding finish ledge 24. Continuous with and immediately below the finish ledge 24 is an outwardly tapered shoulder portion 26. Immediately below and integral with the shoulder portion 26 is a main cylindrical body portion 28. The body portion 28 terminates at its lower end in a generally hemispherical bottom portion 30. A centrally located heel 32 is in the geometric center of the generally hemispherical bottom 30 of the parison 20. A sprue 34 extends radially outwardly from the center portion of the heel portion 32 of the bottom 30 of the parison 20. The parison 20 formed according to the present invention is blown by conventional blow molding techniques into a finished container. Preferably, the organic, thermoplastic parison 20 is fabricated from a highly orientable plastic. The plastic, when blow molded into a finished hollow container, is stretched to induce biaxially molecular orientation to yield a final container having excellent anti-gas permeability properties and mechanical strength properties. Particularly preferred for the parison 20 according to the present invention is a polyethylene terephthalate plastic material of an inherent viscosity of greater than 0.6.

Figure 2:
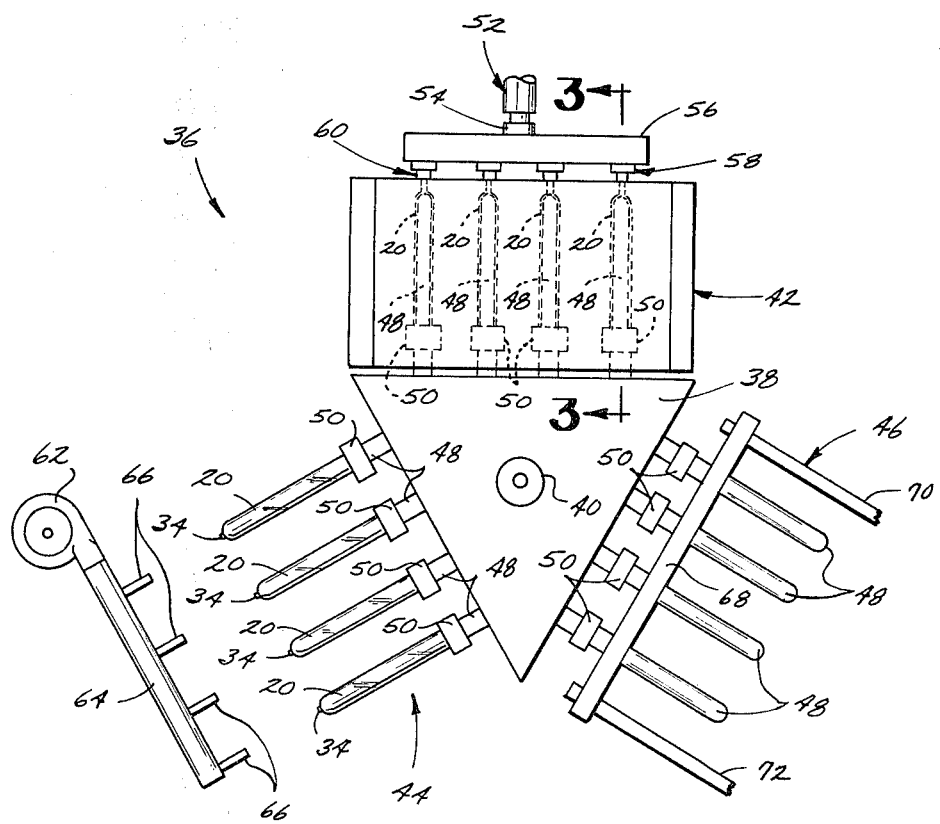
FIG. 2 is a schematic plan view of a parison injection molding device incorporating the features of the present invention.

Referring to FIG. 2 there is illustrated a schematic plan view of a parison injection molding system incorporating the advantageous features of the present invention. A rotary injection molding machine 36 is provided which includes a centrally located rotatable turret 38. The turret 38 rests upon a rotary support shaft 40 which is rotated about its longest axis by a conventional drive means, not shown. The rotary molding machine 36 includes a parison injection staion 42, a parison cooling station 44 and a parison ejection station 46. Each station includes a plurality of horizontally spaced-apart core poins 48. Each core pin 48 includes an alignment boss 50 which properly positions the core pin 48 within the injection molds, described hereinafter. The parison injection station 42 includes a bipartate injection mold, shown only in top plan view in FIG. 2 and described in detail hereinafter, which accepts molten plastic from a reciprocating screw plasticizer 52. The plasticizer 52 is connected, via a hollow coupling 54, to a plastic distribution manifold 56. The manifold 56 includes a plurality of horizontally spaced-apart nozzle housings 58 which support injection nozzles 60. The injection nozzles 60 fit within the injection molds, as illustrated in detail hereinafter, to supply molten plastic to the injection molds. In operation, liquid plastic is moved under pressure from reciprocating screw plasticizer 52 through the coupling 54 and into the manifold 56. The plastic is delivered from the manifold 56 through the nozzle housings 58 into the injection nozzles 60 for delivery into the integral cavities of the injection mold around the core pins 48 and form the parisons 20. After formation of the parisons, and with sufficient mold residence time for solidification of the liquid plastic, the injection molds are split vertically to allow rotation of the newly formed parisons 20 on the core pins 48 to the parison cooling station 44. It will be appreciated that the injection nozzle 60, and complementary recess described in detail hereinafter, can be used equally well with a conventional injection blow molding apparatus.

After removal of the newly formed parisons 20, the injection molds are again closed about the nozzles 60 to receive a new charge of molten plastic from the plasticizer 52. At the parison cooling staion 44, the still warm parisons 20 on the core pins 48 are subjected to a high pressure cold air blow via a high speed air pump 62 which supplies a high velocity of air, for example, a thousand feet per minute through an air transfer manifold 64 to the air nozzles 66. The air nozzles 66 are arranged such their output of cold air is directed to blow upon the sprue portions 34 of the parisons 20 as well as the heel portions 32. After sufficient time has elapsed for substantial cooling of the sprues 34 and heel portions 32 of the parisons 20, the turret 38 is rotated about the rotary support shaft 40 to index the parisons 20 to the parison ejection staton 46. Obviously, such rotation of the cooled parisons 20 bring the next group of newly injection formed parisons 20 into the cooling station 44. At the parison ejection station 46 a shuttle bar 69, driven by a pair of drive rails 70 and 72, moves the parisons horizontally to remove them from the core pins 48 to a collection station, not shown.

Figure 3:
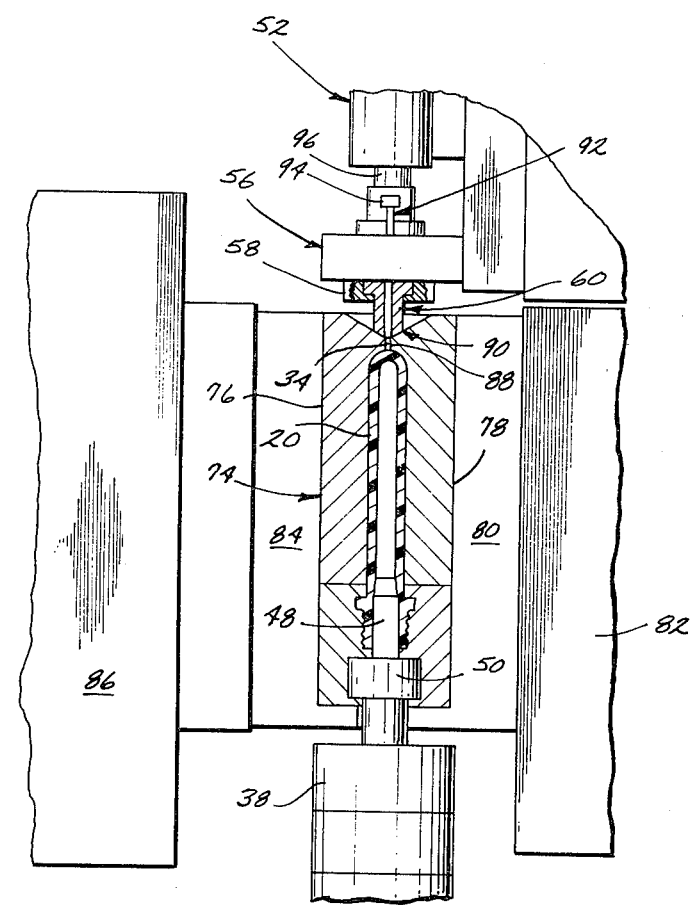
FIG. 3 is a side elevational view taken along the lines 3—3 of FIG. 2.

FIG. 3 illustrates a side elevational view showing, in more detail, the parison injection station 42 and the plasticizer 52 in operative relationship to the distribution manifold 56, injection nozzle 60 and plasticizer 52. A bipartate, vertically separable, parison mold 74 includes an upper mold half 76 and a lower mold half 78. The lower mold half 78 rests upon a mold retainer block 80 and is secured thereto by conventional means. The mold retainer block 80 is supported on and secured to a stationary base plate 82. The upper mold half 76 is secured to and elevated by a mold retainer block 84 which is secured to and elevated by a mold elevation platen 86. The mold elevation platen 86 is moved upwardly by conventional elevation means, not shown. The center of the injection mold 74 is hollow and accepts the core pin 48 and provides an intervening space wherein the parison 20 is formed by injection molding. The mold halves 76 and 78 may be internally channeled to accept mold coolant to aid in rapid cooling of the injected plastic. Such cooling aids in retarding unwanted crystallization of the plastic. The injection mold 74 includes a gate 88 which communicates with a mold recess 90 which accepts and mates with the injection nozzle 60, as more clearly illustrated in FIGS. 4 and 5. The injection nozzle 60 is secured to the manifold 56 by the nozzle housing 58. An internally disposed shut-off pin 92, described in detail hereinafter, which is moved by a shut-off pin transfer means 94 provides means for stopping plastic flow through the injection nozzle 60 when sufficient plastic from the plasticizer 52 has been passed into the mold 74. As illustrated in the drawing, the plasticizer 52 is connected to the distribution manifold 56 by a hollow coupling 96.

Figure 4:
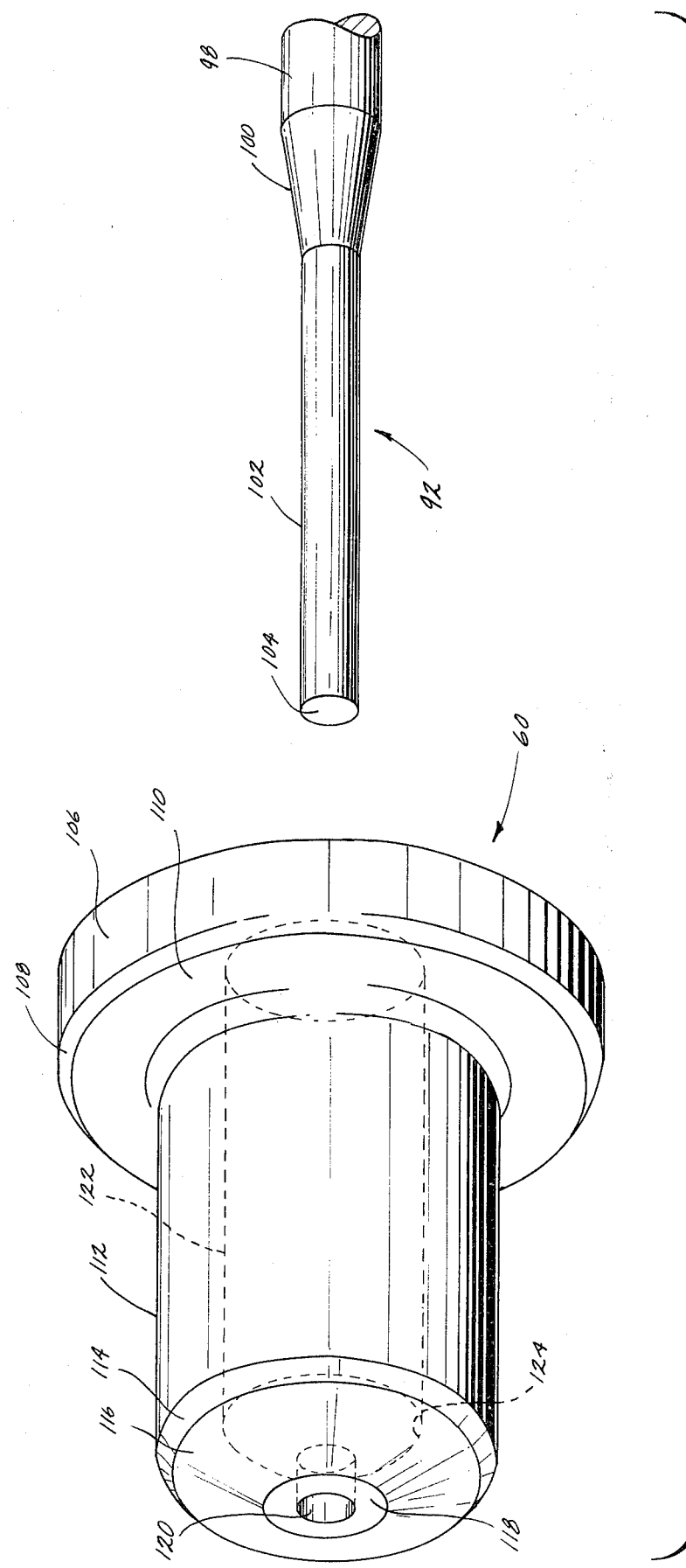
FIG. 4 is a perspective view of the injection nozzle and shut-off pin according to the present invention.

FIG. 4 illustrates a perspective view of the injection nozzle 60 and the shut-off pin 92 according to the present invention. The shut-off pin 92 includes a main shaft portion 98 which is connected to the pin transfer means 94. The main shaft 98 terminates in a beveled intermediate portion 100 which in turn terminates in a flexible shaft portion 102. The flexible shaft portion 102 can have a flat end portion 104 as illustrated. Alternatively, the end portion 104 can be chamferred or rounded to minimize misalignment impact damage.

The injection nozzle 60 includes a base portion 106 which is continuous with an acutely angled, beveled upper base edge portion 108. The edge portion 108 is continuous with a generally flat face portion 110. A generally cylindrical hollow main body portion 112 rests upon and is integral with the base portion 106 of the injection nozzle 60. At the upper-most end of the hollow main body 112 is a transfer control portion 114 which merges into an acutely angled mating surface 116. The angled mating surface 116 merges into a flat central portion 118 which accommodates an outlet port 120. Internal of the injection nozzle 60 is a generally cylindrical plastic passageway 122, illustrated in phantom, extending through the base portion 106 and the hollow main body 112 and terminating at an angle passageway end portion 124 which merges with the outlet port 120. The diameter of the flexible shaft 102 is 0.001–0.0012 thousandths of an inch in diameter less than the diameter of the outlet port 120 in the preferred practice of the invention, such that the leading portion of the flexible shaft 102 fits snugly within the outlet port 120, but provides minimal metal-to-metal contact. The angles passageway end portion 124 acts as a guide means to assure proper entry of the flexible shaft 102 into the outlet port 120 as the main shaft 90 is advanced toward the outlet port 120. Typically, a maximum flex of 0.020 inches is sufficient to allow proper insertion into the outlet port 120. The entire shut-off pin 92 is preferably fabricated from H-13 commercially available tool steel of a hardness of 50–55 Rockwell C. Generally the flexible shaft 120 is flame hardened for increased service life. A clearance of 0.0006 inches per side with the outlet port 120 is sufficient to allow complete shut-off of plastic flow when crystallizable plastics are used.

Figure 5:
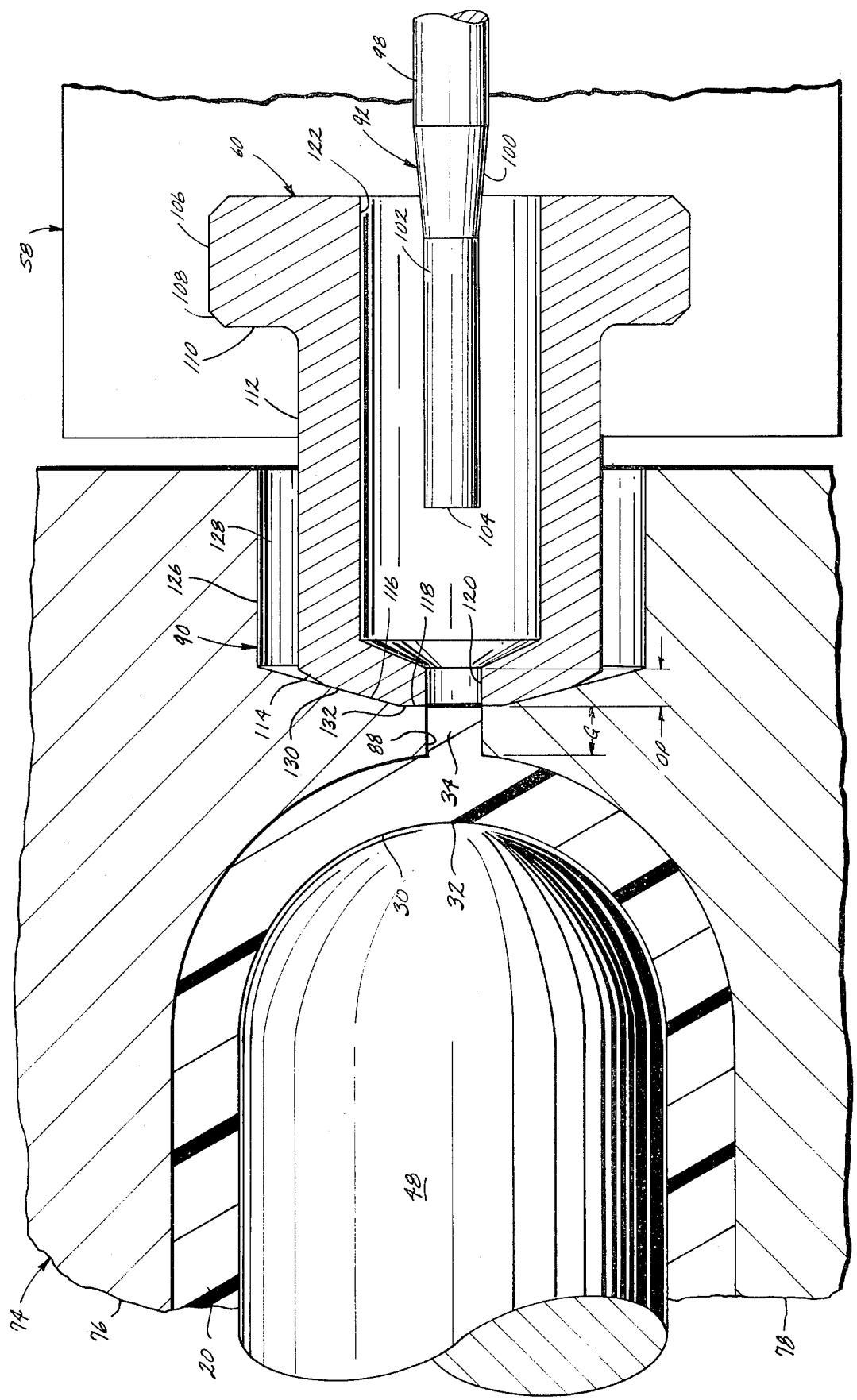
FIG. 5 is a cross-sectional view of the injection mold in operating engagement with the injection nozzle and shut-off pin of the present invention.

As best illustrated in FIG. 5, the mold recess 90 includes a recess wall 126 which is spaced apart from the main body 112 of the injection nozzle 60 to form a annular void 128. The void 128 provides air insulation between the mold recess 90 and the majority of the surface area of the injection nozzle 60. The mold recess 90 further includes an acutely angled mating surface 130 which is of complementary angled to the angled mating surface 116 of the injection nozzle 60. The angled mating surface 130 terminates at a centrally located, flat mating surface 132 which is of the same radial distance as the flat central portion 118 of the injection nozzle 60, such that the portions 118 and 132 match identically in geometry.

The acute angle used for these mating surfaces is determined by the injection nozzle's motion relative to the mold mating surface during the systems start up and shut down thermal cycles. The angle is set so that the nozzles horizontal and vertical motion components determine the acute angle such that the nozzle backs out of its taper location as it slides past the mating surface.

One of the important features of the present invention is the provision of the void 128 which separates the mold recess wall 126 contact with the main body portion 112 of the injection nozzle 60. During start-up procedures for the injection molding system the injection nozzle 60 and the mold 74 are heated and accordingly thermally expand. In currently available injection molding systems the injection nozzle 60 would be in intimate frictional contact with the mold 74 and be subjected to substantial stresses in the event it did not expand at an identical rate to the mold 74 during heat-up procedures. Conversely, during cool-down procedures when the injection molding system would contract due to thermal cooling, the injection nozzle 60 would not contract at the same rate as the mold 74 and would again be subjected to crushing stresses as the metal of the mold 74 contracted around the injection nozzle 60. Such problems have caused substantial difficulties in long term operations of high temperature injection molding machines in the past. The present invention militates against such problems by providing the void 128 intermediate the mold recess 90 and the main body portion 112 of the injection nozzle 60 thereby lengthening injection nozzle lifetimes by preventing contraction of the mold 74 around the base 112 of the injection nozzle 60.

Another important feature of the present invention is the provision of a beveled heat transfer control portion 114 intermediate the main body portion 112 and the angled mating surface 116 of the injection nozzle 60. The beveled heat transfer control portion, as clearly illustrated in FIG. 5, is not in direct thermal contact with the angled mating surface 130 of the mold 74. Accordingly, heat which is contained in the portion 114 is not transferred from the hot nozzle 60 through the portion 114 after the shut-off pin 92 has been moved forward to close the outlet port 120 to stop hot plastic flow into the mold 74. Such elimination of heat flows through portion 114 to mold 74 accelerates the cooling of the sprue 34 of the parison 20. This militates against crystallization of the plastic in the sprue 34. Thus a more amorphous sprue is formed which can be blown and oriented to become part of the bottom of the container.

After molten injected plastic has passed through the passageway 122 into the mold 74 and the flexible shaft 102 of the shut-off pin 92 has been moved into position in the outlet port 120, it is important to quickly transfer heat from the sprue 34, without requiring extra cooling of the remainder of the mold 74. Such rapid heat transfer out of the sprue 34 quickly cools the material so as to allow minimal crystallization in the sprue area 34. The heat which is contained in the molten charge resident in the pasageway 122 is dissipated through the portion 114, after flow is stopped, which portion 114 is not in mechanical contact, yet is in thermal contact, with the hot surface 130 of the mold 74.

Thus, the sprue 34 can be cooled rapidly once the influx of molten plastic charge has been stopped and yet the plastic charge in passageway 122 need not be cooled adjacent the outlet port 120 since substantial heat is retained in the nozzle 60 via portion 114, such heat not entering the mold 74.

It has been discovered according to the present invention that by causing the total distance of the gate 88, indicated at FIG. 5 by area G and the outlet port 120 indicated at FIG. 5 by area OP, to equal sixty thousandths of an inch or less and by the provision of the beveled heat transfer control portion 114, that an essentially amorphous sprue portions 34 can be formed on the parison 20. By such an expedient, the sprue portion 34 can be blown as an integral part of the container body without requiring any sprue removal step in an injection molding cycle. This presents a substantial advantage over conventionally used injection molding systems by lowering net cycle time and removing one set of mechanical devices, namely sprue cutters, from the system.

Figure 6:
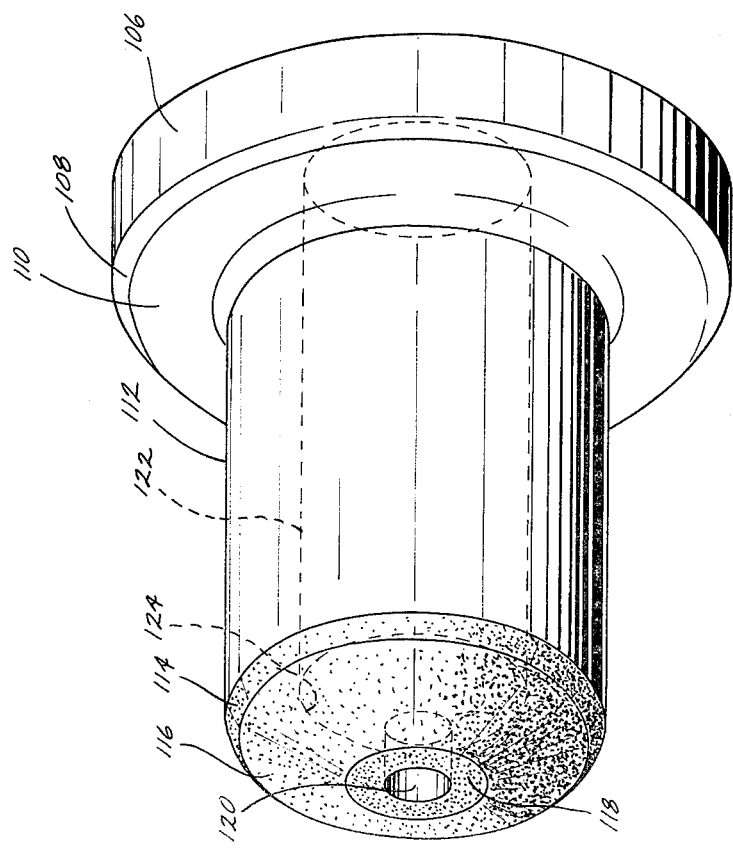
FIG. 6 is a perspective view of an alternative embodiment of an injection nozzle according to the present invention.

In an alternative embodiment of the invention, illustrated in FIG. 6, the portions 118, 116 and 114 of the injection nozzle 60 are caused to be roughened to decrease the effective heat transfer surface area they present to the mold 74. In the preferred embodiment, the roughening up or pitting of the surface is accomplished by any conventional vapor-honing or acid-etching technique to roughen the surfaces 118, 116 and 114.

Figure 7:
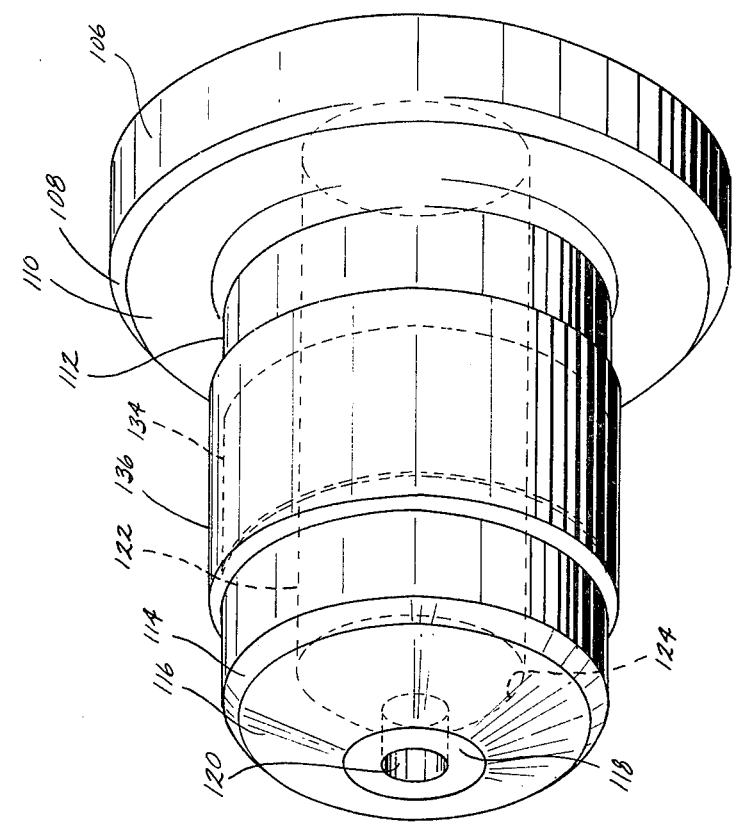
FIG. 7 is a perspective view of an alternative embodiment of the injection nozzle according to the present invention.

In the embodiment of the invention illustrated in FIG. 7, a heater band 134 is disposed about the middle of the main body portion 112 of the injection nozzle 60 to provide extra heat into the passageway 122 so that the minimal amount of heat dissipated by the portion 114 or the roughened portions 118, 116 and 114 will not adversely affect that portion of the molten plastic which is maintained at the ready in the passageway 122 after the shut-off pin 92 has been moved into position in the outlet port 120 to stop the plastic flow at the end of an injection cycle. While it is important to quickly cool the sprue 34 in the outlet port 120 and the gate 88, it is equally important in some applications to maintain the plastic in the passageway 122 at a sufficiently high temperature that when the shut-off pin 98 is withdrawn from the outlet port 120 the injection of the plastic through the passageway 122 occurs rapidly to shorten injection cycles. In the preferred embodiment of the invention illustrated in FIG. 7, a cover shroud 136 fabricated of an insulated material surrounds the entire heater band 134 to effectively direct substantially all of the heat generated in the heater band 134 into the passageway 122. In FIGS. 6 and 7, like reference numerals define identical structures to the injection nozzle 60 illustrated at FIG. 4. Similarly, a set of conventional thermal pins or so-called heat pipes may be inserted via bored holes in to the main body portion 112 parallel to the main body portion 112 to provide heat.

Alternatively, in another preferred embodiment of the invention, when using the embodiments of the invention illustrated in FIGS. 6 and 7, the shut-off pin 92 may be removed from the apparatus, or held stationary in a position slightly retracted from its full shut-off position, to allow for a thermal shut-off means. When the shut-off pin 92 is maintained in a partially retracted position it acts as a thermal pin, discussed above, to maintain the molten plastic at the proper pre-injection temperature. According to this embodiment of the invention, the roughened surface of the portions 118, 116 and 114 maintain heat in the nozzle 60 and facilitate removal of heat from the sprue 34 of the parison 20 in the outlet port 120 to essentially stop plastic flow and quickly cool the sprue 34 when the parison cavity has been filled and no more material flows through the outlet port 120. The material finally collected in the outlet port 120 when the parison 20 is fully formed within the mold 74 quickly cools because of the surface roughened effect keeping heat from the nozzle 60 from flowing into the mold 74, which provides greater heat dissipation from the sprue 34 by minimizing heat transfer from the molten charge into the sprue 34 and accordingly provides a thermal shut-off for the plastic flow through the passageway 122. Such thermal shut-off simplifies manifold design. Alternatively, the embodiment of the invention illustrated in FIG. 7 provides a substantial plastic viscosity difference between that portion of the plastic which is in the relatively colder outlet port 120, surrounded by the relatively cold surfaces 118, 116 and 114 compared to the plastic in the area of the heater band 134. Accordingly, the viscosity differential between the hot area under the heater band 134 and that material in the colder area of the outlet port 120 causes such a flow distortion as to shut off the plastic flow when the parison 20 is fully formed.

Either embodiment of the invention, using the shut-off pin 92 or a thermal shut-off mechanism without the shut-off pin 92 have been found to be fully offerable with the invention.

In accordance with the provisions of the patent statutes, I have explained the principals and best mode of operation of the preferred embodiments of my invention, and have illustrated and described in the typical embodiments what I consider to be the best embodiments.

I claim:

1. An injection nozzle comprising:
   a hollow base portion;
   a hollow main body portion continuous with said hollow base portion and extending outwardly therefrom;
   a beveled heat transfer control portion extending inwardly of said hollow main body portion and joining with said main body portion at an acute angle and being continuous with said hollow main body; and
   a mold mating portion extending inwardly of said beveled heat transfer control portion and terminating in a centrally located outlet port, said outlet port having an inwardly extending annular wall providing fluid communication with said hollow main body portion, said mold mating portion suited for contact with an injection mold inlet and said inwardly extending annular wall of said outlet portion having a height of less than 0.06 inches.

2. The invention defined in claim 1 wherein said beveled heat transfer control portion is smooth surfaced.

3. The invention defined in claim 1 wherein said beveled heat transfer control portion has a roughened surface.

4. The invention defined in claim 1 wherein said mold mating portion has a smooth surface.

5. The invention defined in claim 1 wherein said mold mating portion has a roughened surface.

6. The invention defined in claim 1 wherein the surface area of said beveled heat transfer control portion is between 20–40 percent of the total surface area of said beveled heat transfer control portion and said mold mating portion.

7. The invention defined in claim 6 wherein the surface area of said beveled heat transfer control portion is about 30 percent of the total surface area of said beveled heat transfer control portion and said mold mating.

8. The invention defined in claim 1 wherein said injection nozzle includes means for heating said hollow main body portion.

9. The invention defined in claim 1 including a shut-off means disposed within said hollow main body portion and suited for insertion into said outlet port to close said outlet port to plastic flow.

10. The invention defined in claim 9 wherein said shut-off pin includes a terminal generally cylindrical portion, said generally cylindrical portion havng a diameter approximately equal to the diameter of said inwardly extending annular wall portion of said outlet port and suited for a low clearance fit with said outlet port annular wall portion.

11. In an injection molding apparatus havng a sectional mold and a plastic distribution manifold assembly with plasticating means for periodically supplying heated plastic material to an injection nozzle in communication with the sectional mold during a molding cycle, the improvement comprising:
    said mold sections movable into sealing engagement to form a mold cavity and defining an injection nozzle accepting recess, said recess having an indwelling recess wall terminating at an acutely angled mating portion which includes a centrally located gate in fluid communication with the interior of said mold cavity;
    said injection nozzle including a hollow base portion in fluid communication with said distribution manifold and insertable into said injection nozzle accepting recess and terminating in a nozzle end portion including an angled heat transfer control portion, said angled heat transfer control portion being more acutely angled than the angle of said acutely angled recess mating portion, such that said heat transfer control portion does not contact said acutely angled mating portion of said recess and said nozzle end portion including an acutely angled mating portion having a centrally located outlet port in fluid communication with said base portion and in registry with said gate portion, said acute angle being substantially equal to the acute angle of said recess wall acutely angled mating portion;
    wherein, the total additive length of the inside of said gate portion of said mold and the inside of said outlet port of said injection nozzle being equal to or less than about 0.06 inches.

12. The invention defined in claim 11 wherein said injection nozzle hollow base portion is generally cylindrically in shape and said injection nozzle accepting recess has a generally cylindrical inside shape, and wherein the outside diameter of said base portion of said injection nozzle is less than the inside diameter of the recessed portion of said mold, such that no contact occurs between the inside surface of the recess and the outside surface of the base of said injection nozzle.

13. The invention defined in claim 11 wherein said angled heat transfer control portion of said injection nozzle is smooth-surfaced.

14. The invention defined in claim 11 wherein said angled heat transfer control portion has a roughened surface.

15. The invention defined in claim 11 wherein said acutely angled injection nozzle mating portion has a smooth surface.

16. The invention defined in claim 11 wherein said acutely angled injection nozzle mating portion has a roughened surface.

17. The invention defined in claim 11 wherein the surface area of said acutely angled heat transfer control portion is between 20–40 percent of the total surface area of said acutely angled heat transfer control portion and said acutely angled mating portion of said injection nozzle.

18. The invention defined in claim 17 wherein the surface area of said angled heat transfer control portion is about 30 percent of the total surface area of said angled heat transfer control portion and said acutely angled mating portion of said injection nozzle.

19. The invention defined in claim 11 including a shut-off means disposed within said hollow main body portion and suited for insertion into said outlet port to close said outlet port to plastic flow.

20. The invention defined in claim 11 wherein said injection nozzle includes means for heating said base portion of said injection nozzle.

21. The invention defined in claim 11 including means for heating said centrally located outlet port.

* * * * *